Sept. 14, 1926.  H. P. HANSON  1,599,525

FLOWERPOT HOLDER

Filed Nov. 6, 1924

Witnesses:
W. R. Olson
Fred M. Davis

Inventor:
Hans P. Hanson
By Rummler & Rummler Attys.

Patented Sept. 14, 1926.

1,599,525

UNITED STATES PATENT OFFICE.

HANS PETER HANSON, OF CHICAGO, ILLINOIS.

FLOWERPOT HOLDER.

Application filed November 6, 1924. Serial No. 748,216.

This invention relates to greenhouse accessories and particularly to methods and means of handling flower pots and potted plants. The main objects of the invention are to provide an improved form of holder or lifting means for pots; to provide such a holder or handle adapted for ready attachment to a flower pot by a simple manual manipulation; to provide such a holder which may also be readily detachable by such manipulation; and to provide a holder of this character of simple and inexpensive form which may be used readily and efficiently by an unskilled person, and without the use of any tools or accessories.

An illustrative embodiment of this invention is shown by the accompanying drawings, in which.

In the construction shown by the drawings, the resilient holder 1 is attached to the rim 2 of the flower pot 3, for which purpose hook-like grips 4 are formed on the lower ends of the side arms, the holder being of inverted U-shape. The main body or handle part of the holder is resilient and may well be made of iron wire, but the grips are substantially rigid though preferably formed integral with the rest of the holder. The medial part serves as a bow member, which is in tension when in use.

Figure 1:
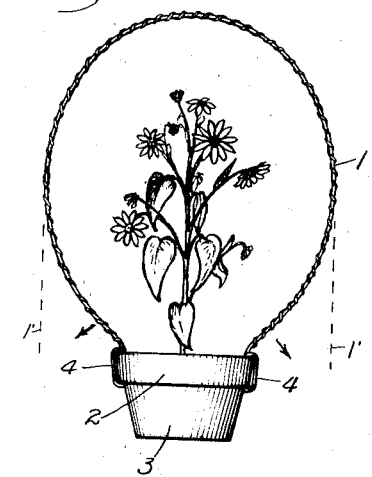
Fig. 1 is a front elevation of a potted plant with a holder attached to the pot ready for use.
Figure 2:
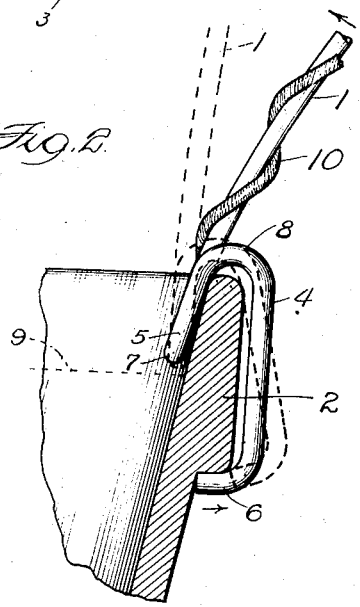
Fig. 2 is a greatly enlarged fragmentary view showing a vertical section through the rim of the pot with one end of the holder attached thereto.
Figure 3:
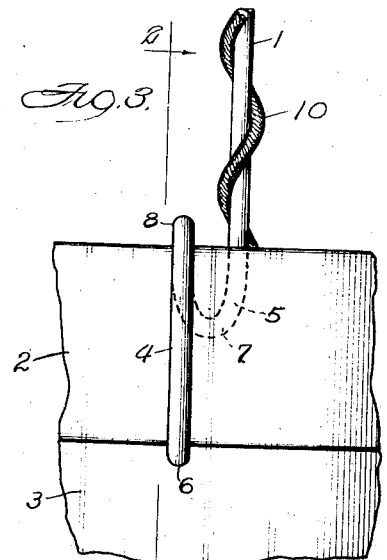
Fig. 3 is similar to Fig. 2 except that a front view is shown instead of a sectional view.

Each grip part comprises mainly a downwardly turned inner hook part 5 at the top to receive the upper edge of the pot rim 2 and an inwardly turned outwardly disposed lower hook tip 6 adapted to engage the lower edge of said rim. The precise form here shown may be more fully explained by describing the method of forming same. Starting with a plain straight rod of suitable resilient material adapted to take a permanent set when sufficiently bent, the terminal portion is first bent back at 7 substantially parallel with the main body to form the loop part 5 (as shown in Fig. 3), and then somewhat nearer the tip, as at 8, another bend is made by folding outwardly and downwardly in a plane perpendicular to the plane of the first bend 5 (as shown in Fig. 2), and finally the extreme tip 6 is bent inwardly in the same plane as the second bend (as also shown in Fig. 2). The opposite end is then formed in like manner. The notch like upper part 5 is adapted to hook over the top of the pot and the hook 6 is adapted to engage the underside of the rim 2. After both ends have been properly formed, the rod may be bent medially into the desired U-shaped form with the sides substantially parallel when not in use, as illustrated by the dotted lines 1' on Fig. 1, or if preferred the medial bend may be made before the end grips are formed.

Figure 4:
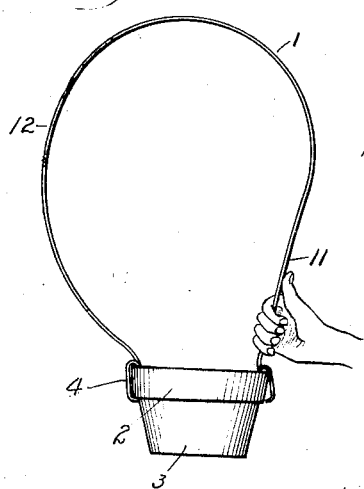
Fig. 4 is substantially similar to Fig. 1, except that the method of detaching the holder is illustrated and the distortion of the main body of the holder incident thereto is shown.

Whenever it is desired to attach the holder to a flower pot, one end is slipped freely into place, as shown on the left side of Fig. 4, reference also being had to the dotted lines in Fig. 2. Then the other end is gripped firmly in the hand, as shown on the right hand side of Fig. 4, and bent reversely somewhat, just above the grip part, so as to throw the upper hook part 5 inwardly and the lower hook part 6 outwardly (see Fig. 2) sufficiently to slip the grip as a whole down into place, whereupon the hand is removed and the resilience of the main loop or middle part springs the device into symmetrical gripping position, shown in Fig. 1. In order to remove the device the reverse operation is followed. The loop tip 7 of the inner hook part 5 usually comes just above the surface 9 of the dirt wherein the plant is rooted. An ornamental strip 10 may be applied to the main body part but is not essential.

Owing to the shape of the pot rim, it is possible to force the handle down into place in attaching same with very little manual exertion and mainly by a simple downward thrust, in which event the inner hook part 5 slides down on the inner side of the pot and the tip of the hook part 6 slides down over the outer face of the rim and snaps inward under the lower edge of said rim. In order to avoid possible scratching or marring of the pot however, especially if the pot is decorated, it is preferable to spring the handle into the position shown in Fig. 4 so as to slip freely into place without appreciable friction on the pot rim. In so doing the holder is sprung inwardly at 11, thus causing the main body to swing to the left as shown at 12 on Fig. 4.

When in place the resultant stress causes the top hook part 5 to pull outwardly and the lower tip 6 to thrust inwardly, whereby escape from the rim is impossible without manual release.

It is to be understood that the said holder may be retained in place indefinitely on the pot, especially upon leaving the greenhouse, as it may be ornamental and at all times serves conveniently for carrying a potted plant both for delivery or shipping and for handling the plant in the home or elsewhere. It is especially useful in connection with funerals and wherever temporary floral decorations are desired.

In forming the inverted U-shaped bend or portion which receives the upper edge of the rim of the flower pot, the rod is bent upwardly at the lower end of each side of the bow member forming an approximately U-shaped bend or portion which fits against the interior of the flower pot and forms a broad bearing at the inner side of the grip. The rod is then bent outwardly and downwardly at right angles to the U-shaped portion to form the inverted U-shaped bend and provide a notch and the outer side of the inverted U-shaped bend or portion terminates in an inwardly extending projection. The supporting shoulder for engaging the lower edge of the rim may be formed directly by the projection.

Although but one specific embodiment of this invention is herein shown and described, it is to be understood that numerous details of the construction shown may be altered or omitted without departing from the spirit of this invention as defined by the following claims.

I claim:

1. A flower pot holder comprising a resilient bow member and consisting of a rod having terminal grips adapted to engage the rim of a flower pot at diametrically opposite points, each of the grips being formed by bending the terminal portions of the rod into approximately inverted U-shaped portions to provide a downwardly facing notch to receive the upper edge of the rim of the flower pot and the outer side of the said U-shaped portion being extended downwardly below the inner side and bent inwardly beneath the said rim and presenting a shoulder to the same to support the rim and confine the same in the notch.

2. A flower pot holder comprising a resilient bow member and consisting of a rod having terminal grips adapted to engage the rim of a flower pot at diametrically opposite points, each of the grips being formed by bending the rod upwardly to provide an approximately U-shaped portion to fit against the inner face of the flower pot and then bending the rod outwardly and downwardly in a plane approximately at right angles to the U-shaped portion to form an approximately inverted U-shaped bend and provide a notch to receive the upper edge of the rim, the outer side of the inverted U-shaped bend being extended below the inner side and bent inwardly beneath the rim and presenting a shoulder to the same whereby the rim is supported and retained in the said notch.

3. A flower pot holder comprising a resilient bow member and consisting of a rod having terminal grips adapted to engage the rim of a flower pot at diametrically opposite points, each of the grips being formed by bending the terminal portions of the rod into approximately inverted U-shaped portions to provide a downwardly facing notch to receive the upper edge of the rim of the flower pot and the outer side of the said U-shaped portion being extended downwardly and bent inwardly beneath the said rim and presenting a shoulder to the same to support the rim and confine the same in the notch.

4. An article of manufacture for the purposes specified consisting of a resilient bow portion and terminal grips formed from a single piece of resilient wire, said terminal grips being adapted to be attachingly associated with the rim and flange of a flower pot, so formed that a plural bearing surface may be had on the inner surface of the pot, the grips held in gripping position by their co-action with the tension of the bow portion, and having a locking portion on the outside of the pot.

5. An article of manufacture for the purposes specified consisting of a single length of wire comprising a resilient bow portion and terminal grip portions, each of said terminal grip portions consisting of two leg portions resiliently joined together adapted to straddle the flanged rim of a flower pot, the conformation of each inner leg portion being such as to provide plural bearing surfaces on the inside of the pot, each outer leg portion having thereon a hooked portion adapted to pass under the flanged ledge of the pot, co-active resilient means joining the leg portions tending to lockingly grip the flower pot, whereby the resilient relations between the gripping end portions and the bow portion tend to hold the handle in gripping relation to the pot.

Signed at Chicago this 7th day of August 1924.

HANS PETER HANSON.